United States Patent [19]

Prapas

[11] 4,362,854
[45] Dec. 7, 1982

[54] POLY(P-METHYLSTYRENE) WITH BROAD MOLECULAR WEIGHT DISTRIBUTION AND PROCESS FOR PREPARATION

[75] Inventor: Aristotle G. Prapas, Edison, N.J.

[73] Assignee: Mobil Oil Corporation, New York, N.Y.

[21] Appl. No.: 335,778

[22] Filed: Dec. 30, 1981

[51] Int. Cl.³ .......................... C08F 2/18; C08F 4/38; C08F 212/12
[52] U.S. Cl. .................................. 526/228; 524/855; 526/347; 526/347.1
[58] Field of Search ...................... 526/347.1, 347, 228

[56] References Cited

U.S. PATENT DOCUMENTS

| | | | |
|---|---|---|---|
| 4,086,287 | 4/1978 | Kaeding | 260/671 P |
| 4,137,388 | 1/1979 | Cutter | 526/73 |
| 4,230,836 | 10/1980 | Canterino | 525/332 |

*Primary Examiner*—Stanford M. Levin
*Attorney, Agent, or Firm*—Charles A. Huggett; Michael G. Gilman; Edward J. Trojnar

[57] ABSTRACT

Poly(p-methylstyrene) with a broad molecular weight distribution and having a melt index suitable for injection molding is prepared by polymerizing p-methylstyrene monomer with a low temperature initiator and a high temperature initiator added with all the monomer at the start of the reaction.

8 Claims, No Drawings

POLY(P-METHYLSTYRENE) WITH BROAD MOLECULAR WEIGHT DISTRIBUTION AND PROCESS FOR PREPARATION

BACKGROUND OF THE INVENTION

The behavior of polystyrene in injection molding is improved with a broad molecular weight distribution in the polymer. The presence of low molecular weight species improves the rate of melt flow at low temperatures, whereas high molecular weight constituents are desirable to obtain adequate strength and to avoid excessive brittleness. It is known, in U.S. Pat. No. 4,137,388, for instance, that broad molecular weight distribution in polystyrene can be obtained by two stage suspension polymerization in which some of the styrene and a low temperature initiator are used in a first stage and additional styrene and high temperature initiator are reacted in a second stage.

BRIEF SUMMARY OF THE INVENTION

This invention relates to poly(methylstyrenes) prepared from methylstyrene isomer mixtures with a high para-isomer content. The poly(methylstyrenes) have a broad MWD (molecular weight distribution) and a desirably high MI (melt index) making the polymer especially suitable for injection molding. Such polymers are prepared by the process of this invention in which methylstyrene isomer mixtures predominantly comprising the para-isomer are reacted in the presence of a high temperature and a low temperature polymerization initiator in which the low temperature initiator is present in a weight amount which is preferably in excess of the high temperature initiator, and in which substantially all of the monomer is introduced with the initiators at the beginning of the reaction.

DETAILED DESCRIPTION OF THE INVENTION

In accordance with this invention para-methylstyrene is suspension polymerized at suitable temperatures ranging from about 80° C. to 150° C. in the presence of a mixture of a high temperature and a low temperature polymerization initiator in which the low temperature initiator is preferably present in excess, usually such that the weight ratio of low temperature initiator to high temperature initiator is from 1:1 to 5:1, more preferably 1:1 to 3:1. Polymerization is conducted under conditions to obtain a melt index (MI) below about 20 and at least about 5.0 and a molecular weight distribution (MWD) of at least about 4.0. More preferably, the melt index is between about 5.0 and about 15 and the molecular weight distribution is at least 6.0.

Methylstyrene isomer mixtures useful in this invention are predominantly comprised of the para-isomer. Preferably the para-isomer comprises at least 90 weight percent of the composition, the meta-isomer comprises 0 to 10 weight percent and the ortho-isomer comprises less than 0.1 weight percent of the isomer mixture. It is desirable that the isomer mixture contain even higher amounts of the para-isomer, for example 95 weight percent or even 97 weight percent and correspondingly reduced amounts of the meta-isomer. Isomeric monomer mixtures of the kind described are easily obtained by dehydrogenation in the conventional manner of ethyltoluene isomer mixtures prepared in accordance with U.S. Pat. No. 4,086,287 (Kaeding and Young) which is incorporated herein by reference in entirety.

Suitable high and low temperature initiators are well known in the art. In general, the term "low temperature initiator" refers to one with a half-life of about 1 to 3 hours at 85° C. Examples include benzoyl peroxide, acetyl peroxide, t-butyl peroxyisobutyrate, p-chlorobenzoyl peroxide, 2,5-dimethyl-2,5 bis(2-ethyl hexanoylperoxy) hexane, and t-butyl peroctoate. A "high temperature initiator" is one which has a half-life of from about 0.3 to 3 hours at 130° C. Examples include t-butyl perbenzoate, t-butyl peracetate, di-t-butyl peroxyphthalate, dicumyl peroxide, alpha, alpha, bis(t-butylperoxy)diisopropyl benzene, and t-butyl peroxy(2-methylbenzoate).

In general, the low temperature initiator is present in a weight amount which is equal to or in excess of the high temperature initiator. For example, ratios of low temperature to high temperature initiators in the range of 1:1 to 5:1 can be used. More preferably the ratio falls within the range of about 1:1 to 3:1.

Polymerization conditions are, in general, similar to those conventionally used. It is, however, considered essential that substantially all of the methylstyrene isomer be introduced at the beginning of the reaction. The reaction is conducted by suspension in water which advantageously contains a suspending agent such as tricalcium phosphate (TCP). It is also advantageous to include a surfactant. In accordance with this invention poly)para-methylstyrene) sulfonate is found to be particularly advantageous. Additives such as antioxidants and mineral oil in the conventional amounts can also be present. The plymerization temperature is usually in the range of about 80° to 150° C. and more generally within the range of about 90°–130° C. The temperatures is usually kept low during the initial phases of the reaction and increased to the higher ranges in the latter phase of the reaction.

It is considered desirable to discontinue the polymerization reaction before all of the residual monomer is consumed in order to achieve a desirable melt index and molecular weight distribution. It has been found that if the reaction is conducted until there is substantially no residual monomer the melt index falls to an undesirable level.

When the polymerization is conducted in the preferred manner as illustrated in the Examples a product having desirable characteristics is obtained, indicated by melt index and molecular weight distribution. Melt index is measured in the usual manner in accordance with ASTM-D-1238 (Condition G). The value for MWD is the ratio Mw/Mn determined by gel permeation chromatography (GPC) in which Mw is the weight average molecular weight and Mn is number average molecular weight.

The invention is illustrated by the following non-limiting examples.

In the examples all parts are by weight unless otherwise specified. The PMS monomer used contained 97 percent para- and 3 percent meta-isomer.

EXAMPLE 1

Easy flow poly(PMS) without mineral oil

To 260 g de-ionized water heated to 85° C. in a one liter reactor were added 3.1 g of tricalcium phosphate (TCP, Stauffer, NF grade) dispersed in 50 g water (high speed blender, 25 mins). The agitation of the charge was increased to 600 RPM, and the polymerization mixture was added to the reactor. The mixture contained 310 g of PMS monomer, 15.5 mg of PPMS-sulfonate, 1.060 g of 98% benzoyl peroxide, 0.397 g of 75% t-butyl peroxy(2-methylbenzoate), 0.155 g of IRGANOX 1076*, and 0.155 mg of PEROX BLUE 2R dye. The suspension was heated at 92° C. for 5 hours. The temperature was then increased to 120°–121° C. over one hour, and kept there for one more houre. The residual monomer was steam-stripped at 122° C. over 3 hours. The dried poly (PMS) beads had a molecular weight distribution (MWD) of 6, and a melt index of 5 (condition G).

* Irganox 1076 is an antioxidant and thermostabilizer available from Ciba-Geigy; octadecyl 3-(3',5'-di-tert-butyl-4'-hydroxyphenyl) propionate.

EXAMPLE 2

Easy flow poly(PMS) with mineral oil

In a similar reaction the polymerization mixture contained 2.6% mineral oil, and the quantities of the two peroxides were 0.943 and 1.191 g respectively. The suspending agent was 6.2 g TCP and 2×(40–50 mg) of potassium persulfate. The temperature profile was 5.5 hours at 92° C., 3 hours for the increase from 92° to 120° C., and 2 hours at 120° C. The poly (PMS) beads were dried in a vacuum oven at 105° C. inches vacuum for a day. The poly (PMS) had an MWD of 6.2, and a melt index of 11.

EXAMPLE 3

Very easy flow poly(PMS)

A mixture such as the one in Example 1, but containing 5.1% mineral oil, and quantities of peroxides the same as in Example 2, was polymerized with the same temperature profile as in Example 2. The resulting poly (PMS) beads were freed of the TCP by washing with acid, and water, and dried at 105° C. and 26 inches vacuum (nitrogen stream) for 2 days. The molecular weight distribution (MWD) of the poly (PMS) was 7.3, and its melt index 19.4 (Cond. G).

What is claimed is:

1. Poly(methylstyrene) having a molecular weight distribution (MWD) of at least about 4.0 and a melt index of at least 5.0, said polymethylstyrene comprising the polymerization product of methylstyrene isomers in the following proportions:
   p-methylstyrene at least 90 weight percent;
   m-methylstyrene 0 to 10 weight percent;
   o-methylstyrene less than 0.1 weight percent.

2. Poly(methylstyrene) of claim 1 having a MWD of at least 6.0.

3. Poly(methylstyrene) of claim 1 in which the methylstyrene monomers are present in the following proportions:
   p-methylstyrene at least 95 weight percent;
   m-methylstyrene 0 to 5 percent.

4. A process for polymerizing a methylstyrene isomer mixture which is predominantly the para-isomer comprising the steps of mixing substantially all of the methylstyrene isomer mixture to be polymerized with polymerization initiators including a high temperature initiator and a low temperature initiator and reacting the mixture at a temperature sufficient to effect polymerization to obtain a product having a MWD of at least 4.0 and a melt index of at least 5.0.

5. The process of claim 4 in which the weight ratio of said low temperature initiator to said high temperature initiator is from about 1:1 to 5:1.

6. The process of claims 4 or 5 in which said low temperature initiator is benzoyl peroxide, and said high temperature peroxide is t-butyl peroxy (2-methylbenzoate).

7. The process of claim 4 in which the polymerization reaction is conducted at a temperature from about 80° C. to 150°.

8. The process of claim 1 in which said methylstyrene isomer mixture comprises at least about 90 weight percent of the para isomer, 0 to 10 weight percent of the meta isomer and less than about 0.1 weight percent of the ortho isomer.

* * * * *

UNITED STATES PATENT AND TRADEMARK OFFICE
CERTIFICATE OF CORRECTION

PATENT NO. : 4,362,854
DATED : December 7, 1982
INVENTOR(S) : Aristotle G. Prapas It is certified that error appears in the above—identified patent and that said Letters Patent is hereby corrected as shown below:

Column 3, line 26, "at 105°C. inches" should read -- at 105°C and 26 inches --.

*Signed and Sealed this*

*Eighth* Day of *March 1983*

[SEAL]

Attest:

GERALD J. MOSSINGHOFF

*Attesting Officer*     *Commissioner of Patents and Trademarks*